US007148393B1

(12) United States Patent
Kuperus

(10) Patent No.: US 7,148,393 B1
(45) **Date of Patent: *Dec. 12, 2006**

(54) ION-SPECIFIC RADIODECONTAMINATION METHOD AND TREATMENT FOR RADIATION PATIENTS

(75) Inventor: John Kuperus, Tampa, FL (US)

(73) Assignee: Radiation Decontamination Solutions, LLC, Oldsmar, FL (US)

(*) Notice: Subject to any disclaimer, the term of this patent is extended or adjusted under 35 U.S.C. 154(b) by 325 days.

This patent is subject to a terminal disclaimer.

(21) Appl. No.: 10/419,635

(22) Filed: Apr. 22, 2003

(51) Int. Cl.
*G21F 9/00* (2006.01)
*G21F 9/16* (2006.01)
*C01G 56/00* (2006.01)
*C01G 57/00* (2006.01)

(52) U.S. Cl. .............................. 588/7; 510/110; 423/7

(58) Field of Classification Search .................... 588/7, 588/901; 134/4, 42; 510/110; 976/DIG. 376; 423/6, 7
See application file for complete search history.

(56) References Cited

U.S. PATENT DOCUMENTS 3,487,916 A * 1/1970 Moroni et al. .............. 206/229
3,488,219 A * 1/1970 Moroni .......................... 134/4
4,729,855 A * 3/1988 Murray et al. ................. 134/2
5,421,897 A * 6/1995 Grawe ........................... 134/6
5,852,786 A * 12/1998 Bradbury et al. .............. 588/1
6,203,624 B1 * 3/2001 Bargues et al. ................ 134/3
6,497,769 B1 * 12/2002 Martin ........................ 134/10
6,566,574 B1 * 5/2003 Tadros et al. .......... 252/186.41
6,605,158 B1 * 8/2003 Martin ........................ 134/10
6,652,661 B1 * 11/2003 Martin ........................ 134/10

FOREIGN PATENT DOCUMENTS

GB 2 328 783 A * 3/1999

OTHER PUBLICATIONS

DOW brochure, "DOWEX Ion Exchange Resins-Using Ion Exchange Resin Selectivity Coefficients", Form No. 177-01755-1104, 3-pp. (available at www.dow.com/PublishedLiterature/dh_038d/09002f138038db4e.pdf on Jan. 18, 2006), date presumably prior to Apr. 22, 2003.*
J.H. Kuperus et al., "Radiological Decontamination: Lab Demonstration On Various Surfaces Using Ion-Exchange Technology", WM '04 Conference, Feb. 29-Mar. 4, 2004, Tucson, AZ, 7-pp. (available at http://www.raddecon.com/JKuperusarticle4441.pdf on Jan. 18, 2006).*

* cited by examiner

*Primary Examiner*—Colleen P. Cooke
(74) *Attorney, Agent, or Firm*—Stanley M Miller

(57) ABSTRACT

A surface contaminated by a radioactive isotope is cleaned by applying to it a solution that contains an ion-specific resin that is weakly bonded to an ion and a weak anion solution including a carrier, water, and an ion that frees the radioactive isotope from the contaminated surface. The radioactive isotope bonds with the ion-specific resin, replacing the ion weakly bonded to said ion-specific resin. In a preferred embodiment, the ion-specific resin is made in the counterion form of citrate, the ion that is weakly bonded to the ion-specific resin is citrate, the carrier is glycerin, the water is de-ionized or distilled, and the ion that frees the radioactive isotope from the contaminated surface is salicylate.

18 Claims, 1 Drawing Sheet

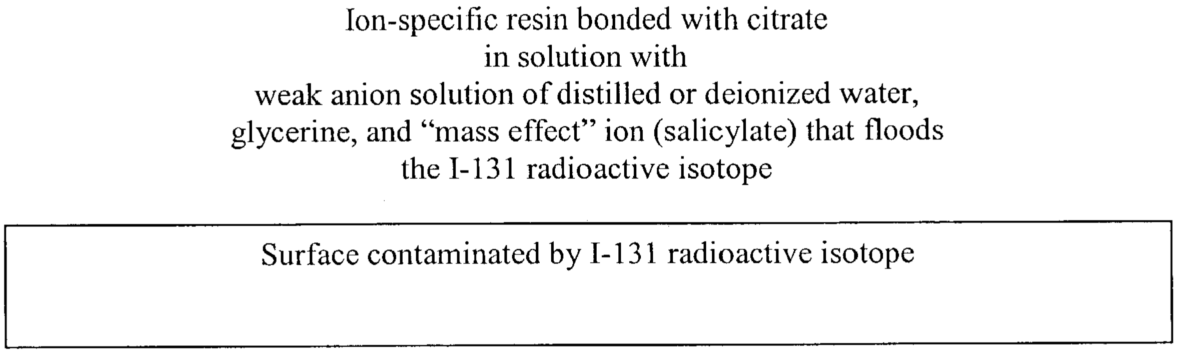

Ion-specific resin bonded with citrate
in solution with
weak anion solution of distilled or deionized water,
glycerine, and "mass effect" ion (salicylate)

Fig. 1

Ion-specific resin bonded with citrate
in solution with
weak anion solution of distilled or deionized water,
glycerine, and "mass effect" ion (salicylate) that floods
the I-131 radioactive isotope Surface contaminated by I-131 radioactive isotope

Fig. 2

Ion-specific resin bonded with I-131

Decontaminated surface

Fig. 3

ION-SPECIFIC RADIODECONTAMINATION METHOD AND TREATMENT FOR RADIATION PATIENTS

BACKGROUND OF THE INVENTION

1. Field of the Invention

This invention relates, generally, to a method for cleaning a radioactive contaminant from a hospital room, a nuclear power plant, or other contaminated areas. More particularly, it relates to a method for removing the radioactive isotope I-131 from contaminated surfaces. It also relates to a method of medical treatment for people exposed to a lethal dosage of cesium or other radionuclid.

2. Description of the Prior Art

I-131 is a radioactive isotope used extensively for treatment of various cancers. Predominantly, it is used for treatment of thyroid cancer. It may be given to patients in the form of a capsule or liquid solution. The I-131 travels throughout the body, enters into the body fluids, and eventually escapes the body as the patient perspires, urinates, regurgitates, or the like. The radioactive contaminant must be cleaned from the walls and floors of the room where the patient has been, as well as fixtures and other items in the room that have been touched by the patient, before another patient can enter the room.

I-131 contamination can also appear in areas of nuclear power plants. It must be removed to make the premises safe.

The known cleaning methods are inadequate because they rely upon cleaning agents that remove generic isotopes, i.e., they are not ion-specific. As a result, the I-131 often cannot be cleaned. In a hospital environment, the hospital is forced to wait a few days for the radioactivity to subside before another patient can be allowed to occupy the room. Obviously, an unused hospital room drives up the cost of health care for everyone. Expenses are also incurred in nuclear power plants or other facilities where such contamination is found.

There are no known ion-specific cleanup solutions for I-131 or other radioactive contaminants.

There are also no known treatments for people who have been exposed to a lethal dosage of cesium. Radioactivity kills over time by slowly attacking various organs. With cesium, and possibly other radioactive ions, the liver extracts the cesium from the circulatory system and transfers it to the gallbladder as bile. The gallbladder drips the bile into the intestines to aid digestion where the radioactive cesium is absorbed again by the body, damaging the organs. This cycle continues until death.

Thus, there is a need for a therapy that could save the lives of those who are exposed to a lethal dose of cesium.

In view of the prior art considered as a whole at the time the present invention was made, it was not obvious to those of ordinary skill in the pertinent art how such a cleanup solution or medical treatment could be provided.

BRIEF DESCRIPTION OF THE DRAWINGS

For a fuller understanding of the nature and objects of the invention, reference should be made to the following detailed description, taken in connection with the accompanying drawings, in which:

FIG. 1 is a diagrammatic representation of the novel cleanup solution before it is applied to a contaminated surface;

FIG. 2 is a diagrammatic representation of the novel cleanup solution as it is applied to a contaminated surface; and FIG. 3 is a diagrammatic representation of the novel cleanup solution after it has decontaminated the surface.

SUMMARY OF THE INVENTION

The long-standing but heretofore unfulfilled need for an ion-specific cleanup solution for cleaning I-131 and other radioactive contaminants is now provided in the form of a new, useful, and nonobvious invention.

The novel method for cleaning a surface contaminated by a radioactive isotope includes the steps of applying to the contaminated surface a solution that includes an ion-specific resin that is weakly bonded to a first ion and a weak anion solution including a carrier, water, and a second ion that frees the radioactive isotope from the contaminated surface. The radioactive isotope bonds with the ion-specific resin, replacing the first ion weakly bonded to the ion-specific resin. The radioactive isotope, upon being freed from the contaminated surface by the second ion, supplants the first ion and bonds with the ion-specific resin.

In a preferred embodiment, the ion-specific resin is weakly bonded to citrate and the ion-specific resin is made in the counterion form of citrate. The ion that frees the radioactive isotope from the contaminated surface is salicylate. The carrier is glycerin, and the water is de-ionized or distilled water.

In a second embodiment, an ion-specific resin is ingested by a person who has been exposed to a lethal dose of radiation. Specifically, upon ingestion of a cesium ion-specific resin, the resin latches onto the free cesium ions in the bowel and binds them up for subsequent excretion as feces. This is a viable method to save the life of an individual overexposed to radioactive cesium and possibly other radioactive elements.

A third embodiment includes a method for creating an ion-specific resin. The novel method includes the step of adding a functional group to the ion-specific resin to enhance the specificity of the ion-specific resin. For example, ferrocyanide is bonded to an ion-specific resin to create an ion-specific resin for cobalt.

An important object of this invention is to provide a wash for I-131 that effectively removes said radioactive contaminant from surfaces so that a cleaned non-radioactive hospital room may be made immediately available for another patient.

A closely related object is to provide such a wash for decontaminating nuclear power plants and other facilities that may become contaminated with I-131 and other radioactive contaminants.

A more specific object is to provide a wash having an ion specific to I-131.

Another major object is to disclose a life-saving method for treating those exposed to a lethal dosage of a radioactive element such as cesium.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

DETAILED DESCRIPTION OF THE PREFERRED EMBODIMENT

The novel wash is provided in the form of a thick liquid formulation, preferably a gel, containing an ion-specific resin that attracts I-131 ions. The gel is applied to a contaminated surface and left alone for a period of time, up to one hour. The gel is then wiped up and discarded. During the period of time that the gel is left alone, the ion specific resin in the gel absorbs the I-131. Accordingly, the surface is decontaminated when the gel containing the ion specific resin is wiped off therefrom.

In a preferred embodiment, the ion-specific resin is AG MP-1 resin, manufactured by Bio-Rad Laboratories in the counterion form of chloride. It is transformed into the counterion of citrate by passing one Molar citric acid through the resin (1.4 liters for every liter of resin) to produce resin in the counterion form of citrate. Any anionic resin as listed below could be formed into the citrate form to provide specificity for the absorption of radioactive iodine. The resin can be in various forms other than citrate to be displaced by different radioactive elements. A "mass effect" (hereinafter defined) salicylate ion can also be different depending upon which radioactive contaminant is to be removed. Different radioactive elements may require different "mass effect" ion solutions and different ion-specific resins. The "mass effect" of salicylate works because the number of salicylate ions out numbers the iodine by more than 100,000 to 1 and due to this the iodine is freed from whatever surface it is on and replaced by salicylate, brought into solution, and captured by whichever anionic resin we choose as long as it is in a form that has a weaker or equal attachment to the ionic form that it is in, such as citrate. If the resin is in the citrate form the "mass effect" ion could also be a citrate ion. The anionic resin could also be in the salicylate form. Either form will bind iodine. This will work for any radioactive halogen, iodine, fluorine and chlorine.

As indicated in FIG. 1, the thick, gel-like solution contains the ion-specific resin and a weak anion solution. The weak anion solution includes distilled or de-ionized water, a suitable carrier such as a thickening agent or even water, and the "mass effect" ion.

Glycerin is the preferred thickening agent because it retains water, thereby preventing the solution from drying up during the application time and therefore allowing the I-131 ions to move freely through the liquid. It is also benign and nonreactive during use and while being stored. The thickening agent could also be methylcellulose, pululan, acacia gum, or any of the known non-reactive thickening agents. Additionally if one of these agents were used, the solution could be allowed to dry and form a film incorporating the ionspecific resin. The film could then be peeled from the surface removing the ionspecific resin and whatever radioactive contamination it had absorbed.

The preferred method includes the steps of dispensing the novel I-131 wash from a bottle and applying it with a sponge, mop, or other suitable application means to a contaminated surface. The wash solution is left on the contaminated surface for a predetermined amount of time, which may vary depending upon the extent of contamination, the activity of the radioactive ion, and the concentration of the wash solution. After expiration of the predetermined amount of time, the entire solution containing the I-131 is wiped up and discarded. This leaves the treated surface in decontaminated condition. Repeat applications may be needed.

A pre-wash may be performed by applying de-ionized or distilled water to the contaminated area to remove stray ions that may interfere with the "mass effect" of the cleaning solution or the binding capacity of the resin.

In the second embodiment, the novel method for treating internal radiation contamination includes the step of preparing an ion-specific resin that upon being ingested attaches itself to a radioactive ion and binds the radioactive ion to the resin for subsequent excretion as fecal matter. More particularly, the ion-specific resin is an ion-specific resin for cesium. The ion-specific resin is ingested by a person who has ingested or absorbed a dangerous amount of radioactive material. Specifically, upon ingestion of a cesium ion-specific resin, the resin latches onto the free cesium ions in the bowel and binds them up for subsequent excretion as feces. This will work for any radioactive Group 11 metal.

The third embodiment of this invention includes a method for creating an ion-specific resin. The novel method includes the step of adding a functional group to the ion-specific resin to enhance the specificity of the ion-specific resin. For example, ferrocyanide is bonded to an ion-specific resin to create an ion-specific resin for cobalt, cesium, thallium or any Group II metal. As a second example, DPTA (diethylenetriaminepentaacetic acid) is bonded to an ion-specific resin to create an ion-specific resin for actinide metals such as uranium and plutonium.

A fourth embodiment of this invention includes a method for applying the ion-specific resin. The novel method includes the step of first applying the gel to a gauze or cheesecloth fabric, and letting it dry to the fabric. A roll of this pre-treated fabric could then be unrolled over a contaminated surface and attached thereto. Lightly spraying the gauze with water would allow the same chemistry to work, but ease of cleanup would be enhanced. The fabric could be rolled back up and disposed of much more easily. This pre-treated fabric method could also be applied to the skin to remove surface contamination of any radioactive element. Also, a person could actually be given a bath in the decontamination solution to remove external surface contamination.

The following theory or working hypothesis is offered as an explanation as to why the novel cleanup solution is so effective and why ingestion of an ion-specific solution can successfully treat radiation sickness.

In simple ion-exchange resins, some resins have a higher affinity to cling to and displace different ions that are weakly bonded to a base resin. It is therefore postulated that it is possible to have a resin with one weakly bonded group in a solution of ions with a weaker attraction than the one bonded to the base resin. For example, a resin may be bonded with a citrate ion in a solution with a relatively high concentration of salicylate ions which have a lower affinity for the resin than the citrate ions. The "mass effect" of the salicylate ions floods the surface (see FIG. 2) and frees the I-131 from the contaminated surface. Because the I-131 is more active than the citrate ion, it displaces the citrate and binds to the resin, as indicated in FIG. 3. This surprising effect has not heretofore been documented and thus represents a new and unique method of ion-specific radioactive decontamination.

The mass weight of I-131 is measured in picograms and the mass weight of salicylate is in the molar range. More specifically, one millieCurie of I-131 weighs $8.08\times10^{-9}$ grams and a one molar solution of salicylate weights 138 grams per liter. Typical cleanup for contaminants is in the microCurie range. The difference of concentrations between the radioactive ion and the flooding ion is twelve (12) orders of magnitude. This facilitates the "mass effect" phenomenon.

The present invention can be applied to any of the known types of strongly acidic cation exchange resins or basic anion exchange resins, and the types of the ion exchange resins can be selected to satisfy other needs such as the objective of the ion exchange treatment. Examples of such ion exchange resins include strongly acidic cation exchange resins such as AMBERLITE 200CT®, AMBERLITE IR120B®, AMBERLITE IR124®, AMBERLITE IR118®, DIAION SK1B®, DIAION SK101®, DIAION PK208®, and DIAION PK 212®, weakly based ion exchange resins such as AMBERLITE XE583®, AMBERLITE IRA67®, AMBERLITE IRA96SB®, DIAION WA10®, DIAION WA20®, and DIAION WA30®, Type I strongly basic anion exchange resins such as AMBERLITE IRA402BL®, AMBERLITE IRA400®, AMBERLITE 440B®, AMBERLITE XT5007®, AMBERLITE IRA400®, AMBERLITE TRA900®, AMBERLITE IRA904®, DIAION SA10A®, DIAION SA11A®, DIAION PA306®, and DIAION PA308®, and Type II strongly basic anion exchange resins such as AMBERLITE IRA411S®, AMBERLITE IRA410®, AMBERLITE IRA910®, DIAION SA20®, and DIAION PA418®.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

What is claimed is:

1. A method for cleaning a surface contaminated by a radioactive isotope, comprising:
 applying to said surface a solution that includes an ion-specific resin that is weakly bonded to a first ion and a weak anion solution including a carrier, water, and a second ion that frees the radioactive isotope from the contaminated surface;
 said radioactive isotope, upon being freed from said contaminated surface by said second ion, supplanting said first ion and bonding with said ion-specific resin.

2. The method of claim 1, wherein the ion-specific resin is weakly bonded to citrate.

3. The method of claim 1, wherein the ion-specific resin is made in the counterion form of citrate.

4. The method of claim 1, wherein the ion that frees the radioactive isotope from the contaminated surface is salicylate.

5. The method of claim 1, wherein the carrier is a thickening agent.

6. The method of claim 5, further comprising the step of wiping up the entire solution;
 whereby the ion specific and radioactive contamination absorbed by the solution is removed.

7. The method of claim 5, wherein the thickening agent is glycerin.

8. The method of claim 1, wherein the water is de-ionized water.

9. The method of claim 1, wherein the water is distilled water.

10. The method of claim 1, wherein the carrier is a non-reactive thickening agent.

11. The method of claim 10, wherein the non-reactive thickening agent is methylcellulose.

12. The method of claim 10, further comprising the steps of:
 allowing the solution to dry and form a film incorporating said ion specific resin;
 peeling the film from the surface;
 whereby the ion specific and radioactive contamination absorbed by the solution is removed.

13. A method for cleaning a surface contaminated by a radioactive isotope comprising the steps of:
 applying to said surface a solution that includes an ion-specific resin that is weakly bonded to a first ion and a weak anion solution including a carrier, water, and a second ion that frees the radioactive isotope from the contaminated surface;
 said radioactive isotope, upon being freed from said contaminated surface by said second ion, supplanting said first ion and bonding with said ion-specific resin;
 allowing the solution to dry on a fabric;
 rolling the fabric out and attaching it to the contaminated surface;
 wetting the fabric with water;
 rolling up the fabric with the ion-specific resin and radioactive ions attached bonded thereto and disposing as a solid roll rather than liquid solution.

14. The method of claim 13, wherein the contaminated surface is human skin.

15. The method of claim 1, further comprising the step of performing a pre-wash of the contaminated surface by applying de-ionized water to the contaminated area to remove stray ions therefrom.

16. The method of claim 1, further comprising the step of performing a pre-wash of the contaminated surface by applying distilled water to the contaminated area to remove stray ions therefrom.

17. A method for cleaning human skin contaminated by a radioactive isotope, comprising the steps of:
 applying to said human skin a solution that includes an ion-specific resin made in the counterion form of citrate that is weakly bonded to a first ion and a weak anion solution including glycerin, distilled water, and salicylate;
 said radioactive isotope, upon being freed from said contaminated surface by said salicylate, supplanting said first ion and bonding with said ion-specific resin.

18. A method for cleaning a surface contaminated by a radioactive isotope, comprising the steps of:
 applying to said surface a solution that includes an ion-specific resin made in the counterion form of citrate that is weakly bonded to citrate and a weak anion solution including glycerin, de-ionized water, and salicylate;
 said radioactive isotope, upon being freed from said contaminated surface by said salicylate, supplanting said citrate and bonding with said ion-specific resin.

* * * * *